No. 735,265. PATENTED AUG. 4, 1903.
H. E. IRWIN.
DETACHABLE TIRE.
APPLICATION FILED MAR. 31, 1903.
NO MODEL. 2 SHEETS—SHEET 1.

Witnesses:
Omer Pallen
L. A. Lindemuth

Inventor:
Herbert E. Irwin

No. 735,265. PATENTED AUG. 4, 1903.
H. E. IRWIN.
DETACHABLE TIRE.
APPLICATION FILED MAR. 31, 1903.

NO MODEL. 2 SHEETS—SHEET 2.

Witnesses:
Omer Vallen
L. A. Lindemuth.

Inventor:
Herbert E. Irwin

No. 735,265. Patented August 4, 1903.

UNITED STATES PATENT OFFICE.

HERBERT E. IRWIN, OF GALESBURG, ILLINOIS, ASSIGNOR TO IRWIN RUBBER COMPANY, OF CHICAGO, ILLINOIS, A CORPORATION OF ILLINOIS.

DETACHABLE TIRE.

SPECIFICATION forming part of Letters Patent No. 735,265, dated August 4, 1903.

Application filed March 31, 1903. Serial No. 150,378. (No model.)

*To all whom it may concern:*

Be it known that I, HERBERT E. IRWIN, a citizen of the United States, residing at Galesburg, in the county of Knox and State of Illinois, have invented certain new and useful Improvements in Detachable Tires, of which the following is a specification.

This invention relates to improvements in that class of double-tube pneumatic tires that are readily detachable from the wheel-rim, and has for its primary object to combine simplicity, positive engagement of the tire upon the rim, and ready detachability in such a tire and to have it adaptable for use upon the wheels of automobiles and vehicles of all kinds as well as upon the bicycle and the like.

Further objects of my invention are to provide means that absolutely prevent the creeping of the tire upon the rim and which are adapted also to support and strengthen the walls of the rim, so that it may sustain shocks and strains without cracking and splitting.

Another object of this invention is to provide at the base of the air-tube a fabric strip and rib which are intended to furnish a good seat for the air-tube and also to protect it from being pinched between the opposing edges of the outer casing when in position upon the rim and, again, to act as a wedge between the opposing edges of the outer casing when the tire is applied to the rim and aid in maintaining the beads in engagement with the rim.

A further object of the invention is to place a hoop or metallic strip in the channel of the rim which bears against the outer edges of the casing when in position on the rim, so that the flanges or beads of the tire-casing may be forced tightly under the overhanging sides of the rim and locked in position, the same only being capable of release by the removal of the pressure brought to bear upon the inner surface of the metallic hoop or band.

Another object of my invention is to provide the outer edges of the casing with dovetailed or ball-and-socket-like abutting surfaces.

These and such other objects as may hereinafter appear are attained by the devices illustrated in the accompanying drawings, in which—

Figure 1:
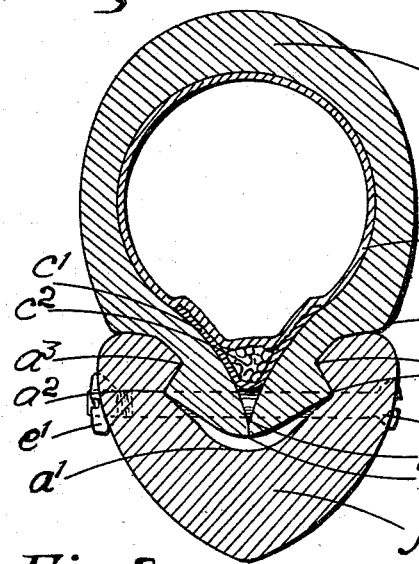
Figure 2:
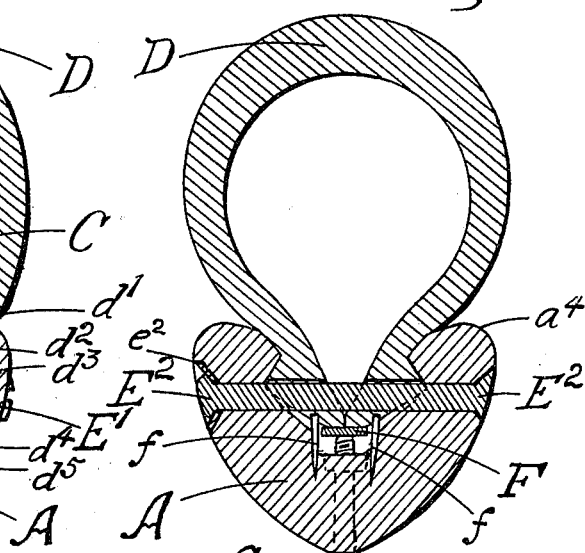
Figure 3:
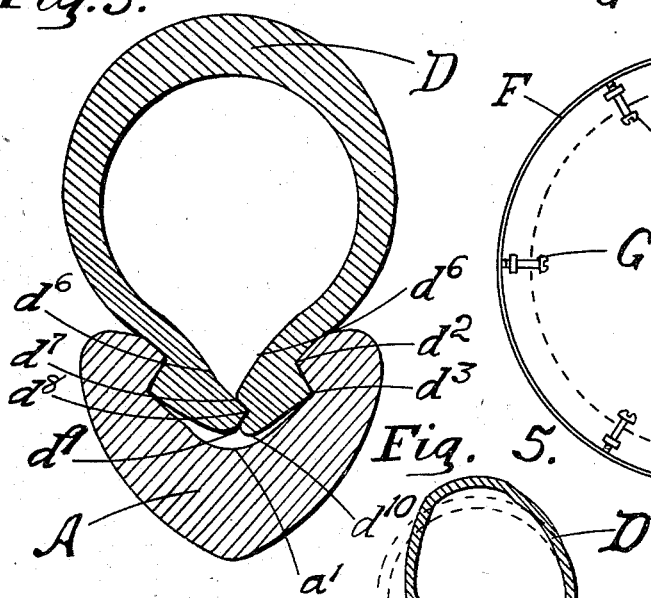
Figure 4:
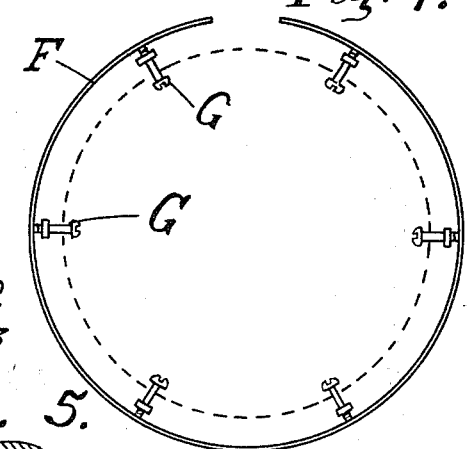
Figure 5:
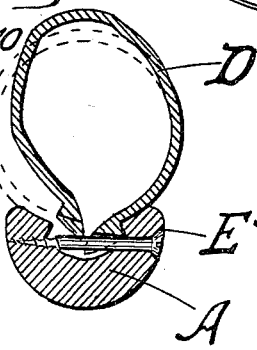
Figure 6:
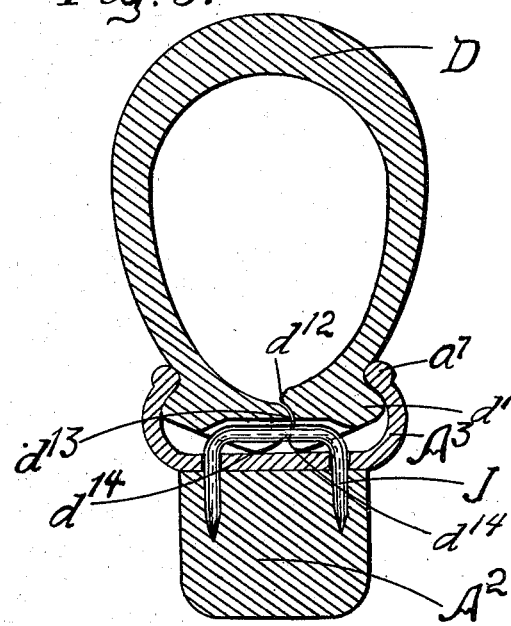
Figure 7:
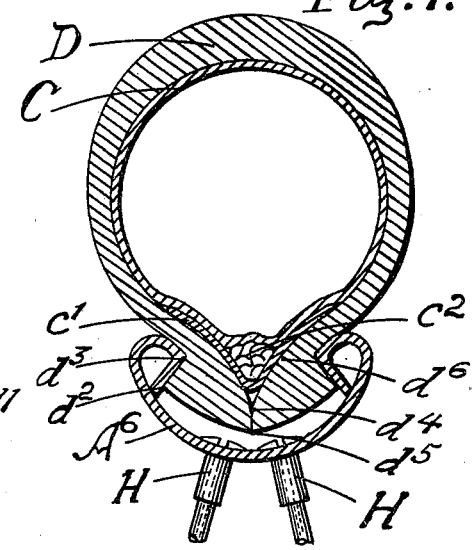
Figure 8:
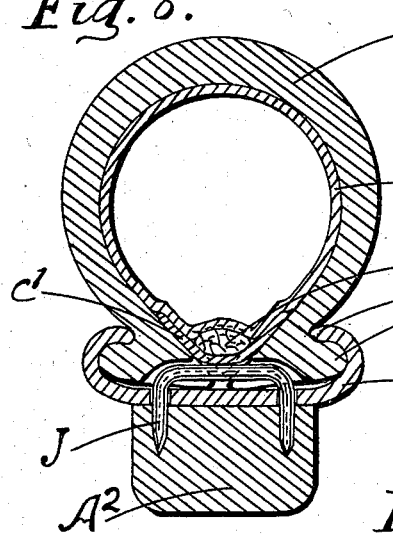
Figure 9:
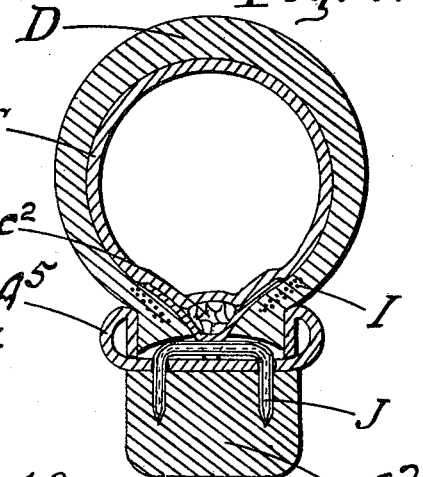
Figure 10:
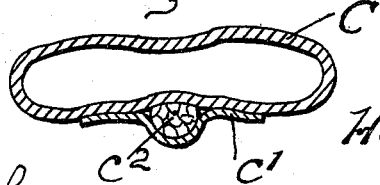

Figure 1 is a transverse section of a wood wheel-rim and tire embodying my invention, showing the inner air-tube inflated. Fig. 2 is a transverse sectional view of a tire and rim, taken through a rivet and showing a locking hoop or band in cross-section. Fig. 3 is a transverse section of a tire having dovetailed or notched abutting surfaces. Fig. 4 is a side view of the broken hoop or band shown in Fig. 2, but drawn at a smaller scale. Fig. 5 is a sectional view of a tire and rim, showing the tire partially detached from the rim. Fig. 6 is a view showing a transverse section of a tire having rounded socket-like abutting surfaces and a metallic rim mounted on a wood felly. Fig. 7 is a sectional view of a tire having its inner air-tube inflated and mounted upon a steel rim that is adapted for wire-spoked wheels. Figs. 8 and 9 are transverse sectional views of tires embodying a staple fastening device. Fig. 10 is a view showing a transverse section of an air-tube deflated and having a fabric strip on its base which incloses a fabric rib, the same being shown in an inflated position in Figs. 1, 7, 8, and 9.

Similar letters of reference indicate the same parts in the several figures of the drawings.

Referring by letter to the accompanying drawings, A indicates a wood wheel-rim, as shown in Figs. 1, 2, 3, and 5.

In Fig. 7 rim $A^6$ is made of steel, and in Figs. 6, 8, and 9 the steel rims $A^3$, $A^4$, and $A^5$ are mounted on wood fellies $A^2$ $A^2$. The outer casing D is split at its inner circumference and incloses an air-tube C, which is provided at its base with a fabric strip $c'$, between which and the air-tube is a fabric rib $c^2$. The said fabric strip and rib lie between the receding surfaces $d^6$ of the opposing edges of the outer casing, which abut at $d^4$ and $d^5$ when the parts are assembled, as shown in Figs. 1 and 7. In the periphery of rim A is a circumferential groove which is undercut at $a^2$ and $a^3$ and with which undercut portions of the groove the beads on the flanges or the edges of the outer casing at $d^2$ and $d^3$ engage. The casing D is provided with a thickened portion or shoulder at $d'$, which rests upon rim A at $a^4$. It is necessary to remove transverse sections of the flanges or outer edges of casing D in order that the flanges may sit astride bolts $E'$, rivets $E^2$, or screws $E^3$, which are placed at proper intervals throughout the circumference of rim A and which pass through the walls and across the channel of the rim.

G indicates bolts which operate as so many jack-screws against broken steel locking-band F, which is held in its proper place by pegs $f$.

In Fig. 3 casing D is provided with dovetailed or notched abutting surfaces at $d^7$, $d^8$, and $d^9$, while in Fig. 6 the casing has ball-and-socket-like abutting surfaces at $d^{12}$ and $d^{13}$.

In Fig. 7, H represents nipples, with a portion of the wire spokes shown.

Staple-like fastening means J are shown in Figs. 6, 8, and 9.

This invention is in the nature of an improvement upon that set forth in the patent granted to myself August 13, 1901, No. 680,486, and the novelty of my present invention resides in a fabric rib that is secured to the base of the air-tube, clamping means which extend through the walls of the rim and which prevent them from spreading and splitting, and a steel band which lies in the channel of the rim and against which bolts operate to force the beads on the flanges tightly against the undercut portions of the groove in the rim.

Other novel features of this invention consist in the rounded socket-like or dovetailed abutting surfaces of the tire and in the metal staple-fastening J, which secures the steel rim to a wood felly and which also prevents the creeping of the tire upon the rim.

The clencher-tire is usually equipped with a flap which lies under the air-tube and is secured to one of the sides of the tire-casing a short distance above its bead. The object of this flap is to prevent the air-tube from getting between the edges of the casing and being pinched thereby. Much difficulty is experienced in placing a tire equipped with such a flap in its proper place on the rim, as the flap is frequently in the way and troublesome to manipulate. Instead of employing this inconvenient flap I cement or vulcanize fabric strip $c'$ on the base of the air-tube C and place between the said fabric strip and air-tube a fabric cord $c^2$, which lies between the edges of the casing and not only removes the danger of pinching the air-tube, but also acts as a wedge between the edges of the casing of the tire when the air-tube is inflated and aids in maintaining engagement of the beads with the rim. It is also both cheaper to equip and more convenient to manipulate a tire provided with a fabric-rib than one with the stiff flap.

It is well to support and strengthen the walls of the rim by clamping means, which may consist of rivets, bolts, or screws passing through the walls and across the channel of the rim, thus preventing the walls from spreading and a consequent cracking and splitting of the rim. The clamping means also pass through notches or openings made in the flanges of the tire, which absolutely provides against any creeping of the tire upon the rim.

I have constructed a simple but effective device for positively securing the tire to the rim, which consists of a steel band formed in the shape of a hoop with its ends approaching each other at the valve-stem. This steel band lies in the channel of the rim and is held in its proper position by pegs, preferably placed beneath the bolts or rivets, which pass across the channel in order that they may be out of the way of the flanges. Bolts having nuts sunken into the rim to prevent them from revolving operate against the steel band F, which holds the beads tight against the undercut portions of the groove and prevents them from being released except when the pressure is removed from the band F.

The abutting surfaces of the flanges in Fig. 3 have a dovetailed-like appearance; but above the abutting surfaces the sides recede to the substantially V shape. In Fig. 6 the abutting surfaces differ from that shown in Fig. 3 in that the abutting surfaces are rounded, resembling in cross-section a ball-and-socket joint, and the lower part of the flanges $d^{14}$ $d^{14}$ rests upon the bottom of the channel of the rim. In Fig. 6 the surfaces of the casing above the abutting surfaces can hardly be said to be V-shaped. Rim $A^3$ in Fig. 6 is not that of the clencher type, and the tire depends upon its engagement with such a rim by the abutting together of the flanges of the casing. Rim $A^3$ has rounded top edges at $a^7$.

It is a common practice to secure metal tires to wood fellies by the use of bolts. In Figs. 6, 8, and 9 I employ fastening means or staples J to secure the rims to the fellies, and notches are cut in the flanges of the casing, into which the staples fit, which prevents creeping of the tire upon the rim in a similar manner as bolt $E'$ and rivet $E^2$ do.

In order to remove the tire from the rim, as shown in Figs. 1, 3, 6, and 7, I deflate the air-tube and by force compress one of the sides of the casing inward, as shown in Fig. 5, in which position it will be readily seen the flanges may be easily removed from the rim.

Fig. 8 is a transverse section of a clencher-tire, showing the hooked edges or the rim at $a^6$ and the hooked edges of the tire-casing at $d^{15}$. The present practice to prevent creeping and to secure a clencher-tire to its rim is by the use of butterfly-bolts or bolts having V-shaped washer-heads. Said V-shaped washer-heads lie between the beads and only prevent the tire from creeping on the rim by friction, while staples J are placed at short intervals in the channel of the rim and positively support the beads throughout the circumference of the tire. The butterfly-bolts are also troublesome to adjust and get in their proper place.

In the tire sides and a short distance above the beads in Fig. 9 are a number of small dots I, which indicate the ends of small wires or steel tape. Tools are required to force such a tire over the edge of the rim to its place.

I do not claim as new a tire having steel tape in its body, but show how staples J and fabric rib $c^2$ may be adapted to this style of a tire.

Changes in the form of the fastening means that lie in or across the channel of the rim, as well as changes in the form of the fabric rib, may be made without departing from the spirit of my invention, and all such changes are contemplated by the following claims.

Having thus described my invention, what I claim, and desire to secure by Letters Patent, is—

1. The combination with a wheel-rim provided with a peripheral channel having overhanging sides, of a tire-casing split on its inner side and provided with marginal flanges or lips, each of said flanges having on its outside a bead adapted to lie under the overhanging sides of the rim and having on its inside opposite said beads surfaces which form between themselves a substantially V or trough shape, and an inner air-tube provided with a fabric strip which in turn secures a ring or band thus forming a rib on the base of the air-tube, which lies in the said trough bottom of the tire-casing, substantially as and for the purpose described.

2. The combination with a wheel-rim provided with a peripheral channel having overhanging sides, of a tire-casing split on its inner side and provided with marginal flanges or lips, each of said flanges having on its outside a bead adapted to lie under the overhanging sides of the rim and having on its inside opposite said beads surfaces which abut against each other, above said abutting surfaces the tire-casing recedes in a substantially V or trough shape, and an inner air-tube provided with a fabric strip between which and the air-tube is a fabric rib which lies in the said V-shaped space of the tire-casing to prevent the air-tube from being pinched thereby, substantially as and for the purpose described.

3. The combination with a channeled wheel-rim having overhanging sides, of a tire-casing split on its inner side and provided with marginal lips or flanges, each of said flanges having on its outside a bead adapted to lie under the overhanging sides of the rim and having on its inside opposite said beads surfaces which abut against each other, said flanges having transverse notches or sections removed from them so that they sit astride means which pass across the channel and through the walls of the rim preventing said walls from spreading and cracking and also preventing the creeping of the tire upon the rim, substantially as and for the purpose described.

4. The combination with a channeled wheel-rim having overhanging sides, of a tire-casing split around its inner side and having annular beads adjacent to said split fitting under the overhanging sides of the rim, and a broken metallic hoop or band which lies in the channel of the rim under the edges of the flanges so that when pressure is brought to bear against the inner surface of said band the beads on the flanges are forced tightly under the overhanging sides of the rim, substantially as and for the purpose described.

5. The combination with a channeled wheel-rim having overhanging sides, of a tire-casing split around its inner side and having annular beads adjacent to said split adapted to lie under the overhanging sides of the rim, said beads having dovetailed or ball-and-socket-like abutting surfaces, and notches removed from the casing which correspond to fastening means of the rim, substantially as described.

6. The combination with a channeled wheel-rim having overhanging sides, of a tire-casing split around its inner side and having annular ribs or beads adjacent to said split adapted to lie under the overhanging sides of the rim, said channeled rim being mounted on and secured to a wood felly and provided with means which fit into corresponding notches in the tire-casing, substantially as described.

7. The combination with a channeled wheel-rim having hooked edges, of a tire-casing split around its inner side and having annular ribs or beads adjacent to the split which engage said hooked edges of the rim, said beads forming between themselves a substantially V-shaped space, and an air-tube provided with a fabric strip which in turn secures a ring or band thus forming a rib on the base of the air-tube which lies in the V-shaped space between the beads, substantially as described.

8. The combination with a channeled wheel-rim having hooked edges, of a tire-casing split around its inner side and having annular ribs or beads adjacent to said split which engage the hooked edges of the rim, said channeled rim being mounted on a wood felly and secured to same by fastening means which fit into corresponding notches in the casing, substantially as described.

9. The combination with a channeled wheel-rim, of a tire-casing split around its inner side and provided with annular beads adjacent to said split, said beads forming between themselves a substantially V-shaped space and at or a short distance above the said beads are steel tape embedded in the body of the tire, and an inner air-tube provided with a fabric rib which lies in the V-shaped space between the beads, substantially as and for the purpose described.

10. The combination with a channeled wheel-rim, of a tire-casing split around its inner side and having annular beads adjacent to said split and at or a short distance above said beads are steel tape embedded in the tire-body, said channeled rim being mounted on a wood felly and secured to same by fastening means which fit into corresponding notches in the casing, substantially as described.

In testimony whereof I have signed my name to this specification in presence of two subscribing witnesses.

HERBERT E. IRWIN.

Witnesses:
DAVID R. JAMES,
MARY A. JAMES.